(No Model.)

W. H. DAGGETT.
KEY.

No. 543,852. Patented Aug. 6, 1895.

Witnesses.
Herbert H. Trowbridge
Payson E. Tucker

Inventor.
William H. Daggett
by Chas. F. Perkins
his attorneys

UNITED STATES PATENT OFFICE.

WILLIAM H. DAGGETT, OF SOMERVILLE, MASSACHUSETTS.

KEY.

SPECIFICATION forming part of Letters Patent No. 543,852, dated August 6, 1895.

Application filed May 10, 1895. Serial No. 548,816. (No model.)

*To all whom it may concern:*

Be it known that I, WILLIAM H. DAGGETT, a citizen of the United States, residing at Somerville, in the county of Middlesex and State of Massachusetts, have invented a new and useful Improvement in Door-Keys, of which the following is a specification.

My invention consists of a key such as is commonly used for locks of doors, desks, and similar articles, having an attachment to the head portion to enable one by the sense of touch to distinguish it from other keys with which it is kept.

When many keys are kept on the same ring, and it is desirable to select one in the dark or where it cannot be plainly seen, it is almost impossible to do so without considerable delay.

Figure 1:
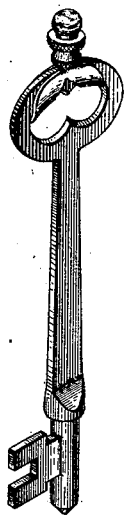
Figure 2:
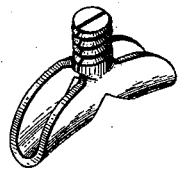

In the drawings, Figure 1 is a perspective view of my invention. Fig. 2 is a perspective view of the clasp detached from the key and ready to be placed upon it.

A is the head of a door or desk key.

B is a clasp made of thin sheet metal doubled upon itself, and each end terminating in a half-screw, which together form the screw-threaded shank C. The nut D secures the ends of the clasp firmly together, and is made in any size or shape that is desired. When it is desired to quickly distinguish one key from a number kept on the same ring, it is readily accomplished by the clasp being attached thereto.

If it were desirable to distinguish two or more keys from many others, different forms could be adopted for the nut to distinguish them from each other as well as from the whole lot.

The invention is applicable to any kind of a key.

What I claim, and desire to secure by Letters Patent, is—

The combination of a key and a clasp B, each end terminating in a half screw forming together the screw threaded shank C, said clasp surrounding the portion of the key forming the ring or the shank and being secured thereto by the nut D, fitting onto the shank C, all substantially as described.

WM. H. DAGGETT.

Witnesses:
 JOHN L. MCLEAN,
 HERBERT W. TROWBRIDGE.